(12) United States Patent  (10) Patent No.: US 8,952,706 B2
Allouche et al.  (45) Date of Patent: Feb. 10, 2015

(54) UNIVERSAL IMPEDENCE PROBE FOR DETECTION OF SIDE-CONNECTIONS THROUGH THERMOPLASTIC, THERMOSETTING AND CEMENTITIOUS LINERS

(75) Inventors: Erez Allouche, Ruston, LA (US); Arun Prakash Jaganathan, Ruston, LA (US)

(73) Assignee: Louisiana Tech University Research Foundation, Ruston, LA (US)

( * ) Notice: Subject to any disclaimer, the term of this patent is extended or adjusted under 35 U.S.C. 154(b) by 440 days.

(21) Appl. No.: 13/434,308

(22) Filed: Mar. 29, 2012

(65) Prior Publication Data

US 2012/0280852 A1 Nov. 8, 2012

Related U.S. Application Data

(60) Provisional application No. 61/468,879, filed on Mar. 29, 2011.

(51) Int. Cl.
*G01R 27/04* (2006.01)
*G01S 13/88* (2006.01)
*G01S 13/86* (2006.01)

(52) U.S. Cl.
CPC .............. *G01S 13/88* (2013.01); *G01S 13/867* (2013.01)
USPC ............................................. 324/637; 342/27

(58) Field of Classification Search
USPC ......... 324/600, 636–638, 647, 654–661, 220, 324/750.16; 342/118, 145, 22, 21, 27, 28, 342/82, 89, 90, 91, 128, 146, 147, 175, 195
See application file for complete search history.

(56) References Cited

U.S. PATENT DOCUMENTS 6,573,721 B1  6/2003 Cull
6,664,914 B2  12/2003 Longstaff et al.
6,672,409 B1  1/2004 Dock et al.
(Continued)

FOREIGN PATENT DOCUMENTS

CN  101392642 A  3/2009
WO  WO2013/049377 A1  4/2013

OTHER PUBLICATIONS

U.S. Appl. No. 13/469,454, filed May 11, 2012; "Beam Steerable UWB Radar"; Allouche, Erez.
(Continued)

*Primary Examiner* — Melissa Koval
*Assistant Examiner* — Trung Nguyen
(74) *Attorney, Agent, or Firm* — Jones Walker, LLP

(57) ABSTRACT

A conduit survey apparatus having a carriage capable of movement axially down a conduit. The carrier includes a radio frequency (RF) signal generator and an RF signal detector positioned on the carriage along with a controller controlling the signal generator and signal detector. The carrier further includes a waveguide with an open throat transmitting signals from the signal generator and directing received signals to the signal detector. Finally, the carrier includes a waveguide positioner mounted on the carrier and adapted to selectively engage an interior wall of the conduit, wherein the waveguide guide is connected to the positioner such that the open throat of the waveguide is within about 1 inch of the interior wall when the positioner engages the interior wall.

20 Claims, 10 Drawing Sheets

(56) References Cited

U.S. PATENT DOCUMENTS

| | | |
|---|---|---|
| 6,956,534 B2 | 10/2005 | Hagiwara |
| 7,508,336 B2 | 3/2009 | Leskin |
| 7,539,271 B2 | 5/2009 | Shor et al. |
| 7,570,063 B2 | 8/2009 | Van Veen et al. |
| 7,864,870 B2 | 1/2011 | Tekin |
| 8,174,443 B2 | 5/2012 | Markus |
| 8,350,570 B2 | 1/2013 | Allouche et al. |
| 2004/0089358 A1* | 5/2004 | Burd et al. ............ 138/98 |
| 2004/0183899 A1 | 9/2004 | Shiota |
| 2005/0115337 A1 | 6/2005 | Tarumi |
| 2011/0196534 A1 | 8/2011 | Ekes et al. |
| 2013/0082866 A1 | 4/2013 | Jaganathan |
| 2013/0113646 A1 | 5/2013 | Allouche et al. |
| 2014/0114334 A1* | 4/2014 | Olson et al. ............ 606/169 |

OTHER PUBLICATIONS

International Searching Authority, International Search Report and Written Opinion issued in PCT/US2008/074832; Nov. 19, 2008.

International Searching Authority, International Preliminary Report on Patentabililty issued in PCT/US2008/074832; Jan. 22, 2010.

Picosecond Pulse Labs; Real-Time Sampling Downconverter Front Ends for Digital Radar and Wide-Band Signaling; Nov. 2004; Boulder, Colorado.

International Searching Authority; International Search Report and Written Opinion issued in PCT/US2012/057604; Dec. 27, 2012.

PCT Application No. US2012/057604; International Preliminary Report on Patentability for Applicant Louisiana Tech University Research Foundation; a Division of Louisiana Tech University Foundation, Inc., et al. dated Apr. 10, 2014.

* cited by examiner

UNIVERSAL IMPEDENCE PROBE FOR DETECTION OF SIDE-CONNECTIONS THROUGH THERMOPLASTIC, THERMOSETTING AND CEMENTITIOUS LINERS

This application claims the benefit under 35 USC §119(e) of U.S. provisional application Ser. No. 61/468,879 filed Mar. 29, 2011, which is incorporated by reference herein in its entirety.

I. BACKGROUND OF INVENTION

A common technique for rehabilitating sewer and water pipelines is lining the deteriorated pipe using a thermoplastic, thermosetting or cementitious product. Cost-effective use of this technique requires the ability to restore side connections or lateral connections (e.g., from a residences to collector lines) using remotely controlled devices placed inside the rehabilitated pipe. This is accomplished most commonly using remotely controlled platforms that carry an assortment of cutters, drills and other devices designed to cut through the freshly installed liner and re-establish the pipe-lateral connection. Current practices generally rely on pre-installation survey where the distance from the access point to the location of the connection is measured and recorded prior to the installation of the liner. In many cases this information provides an estimate as to the approximate location of the lateral connection, but is not adequate for pin-pointing the exact location at which the blade should engage the liner.

II. BRIEF DESCRIPTION OF DRAWINGS

Figure 1:
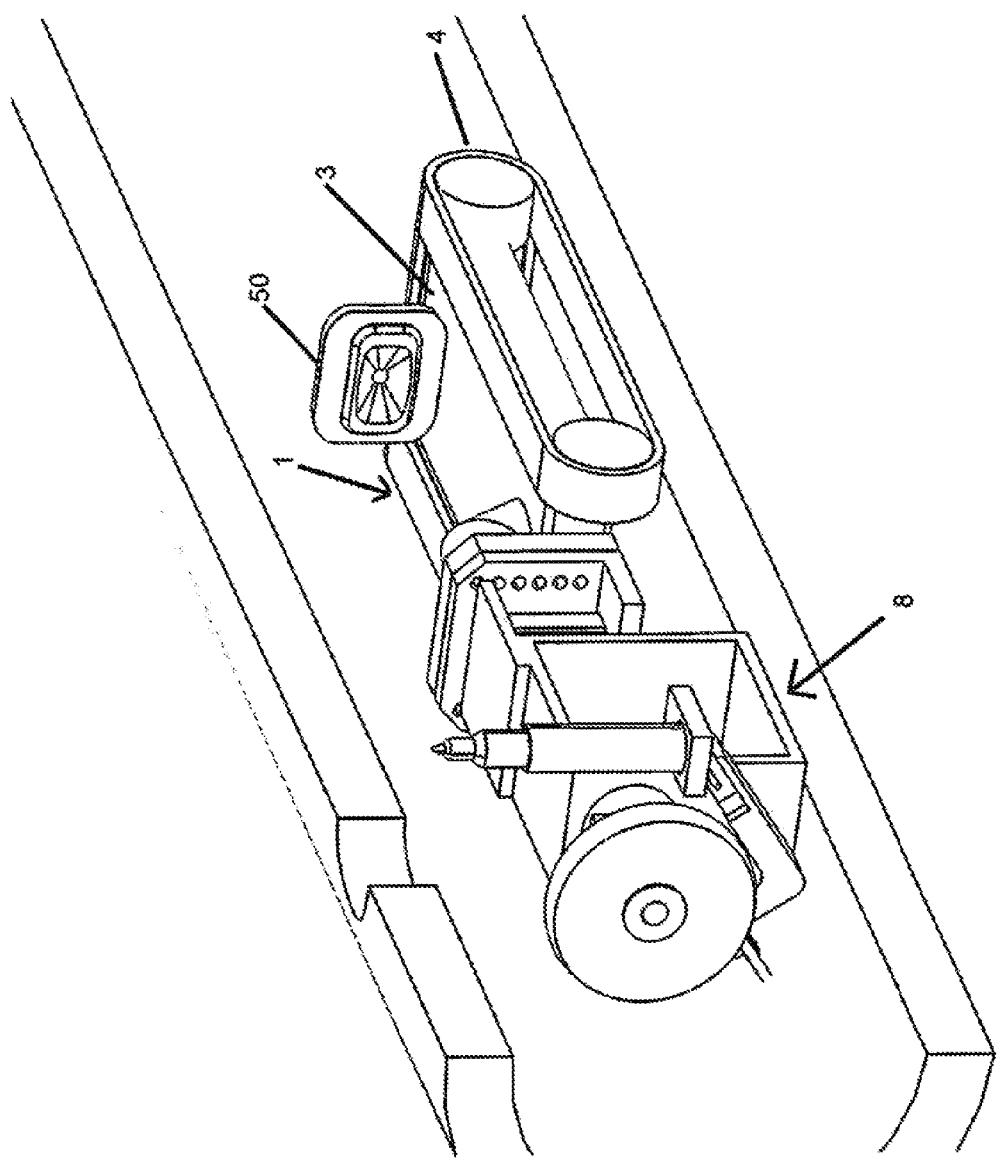
Figure 2:
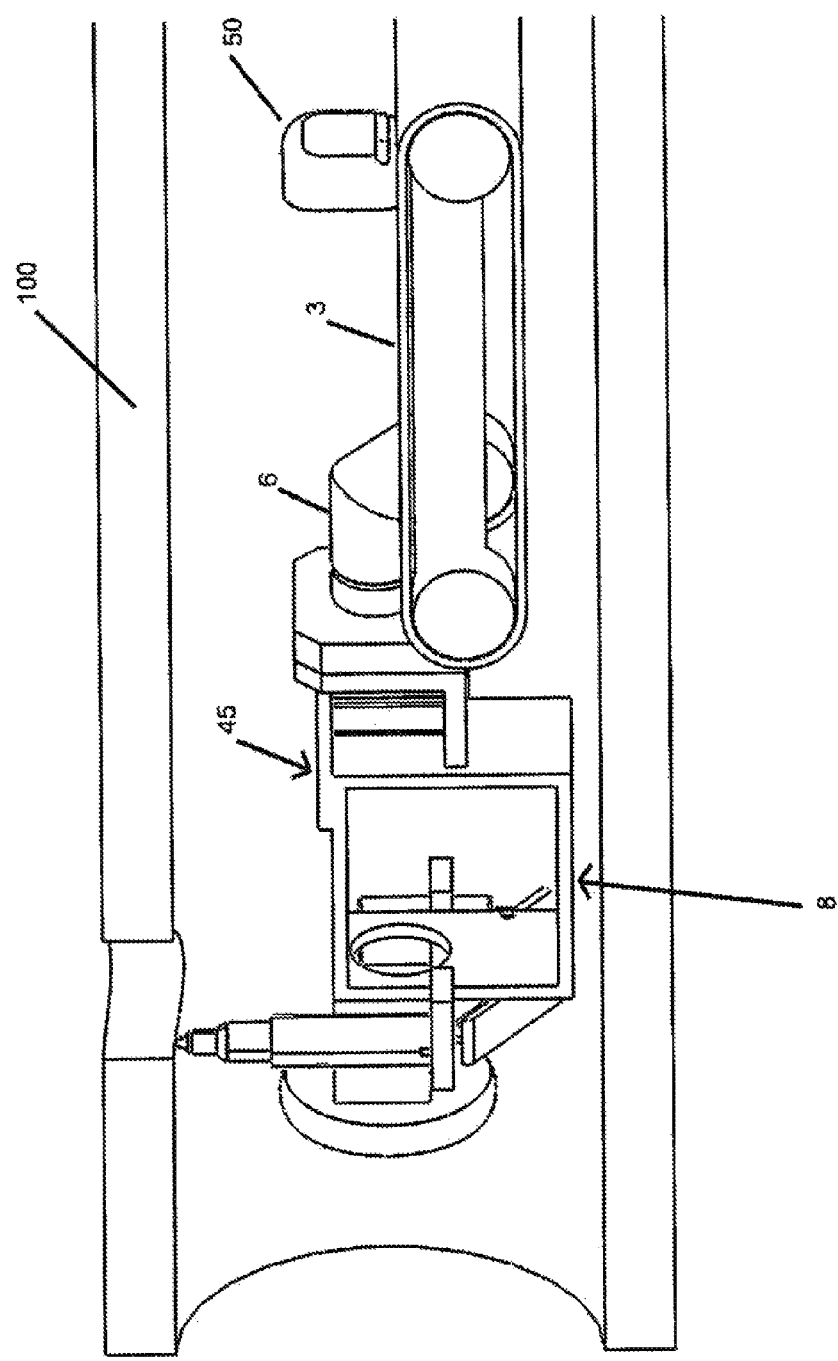
Figure 3:
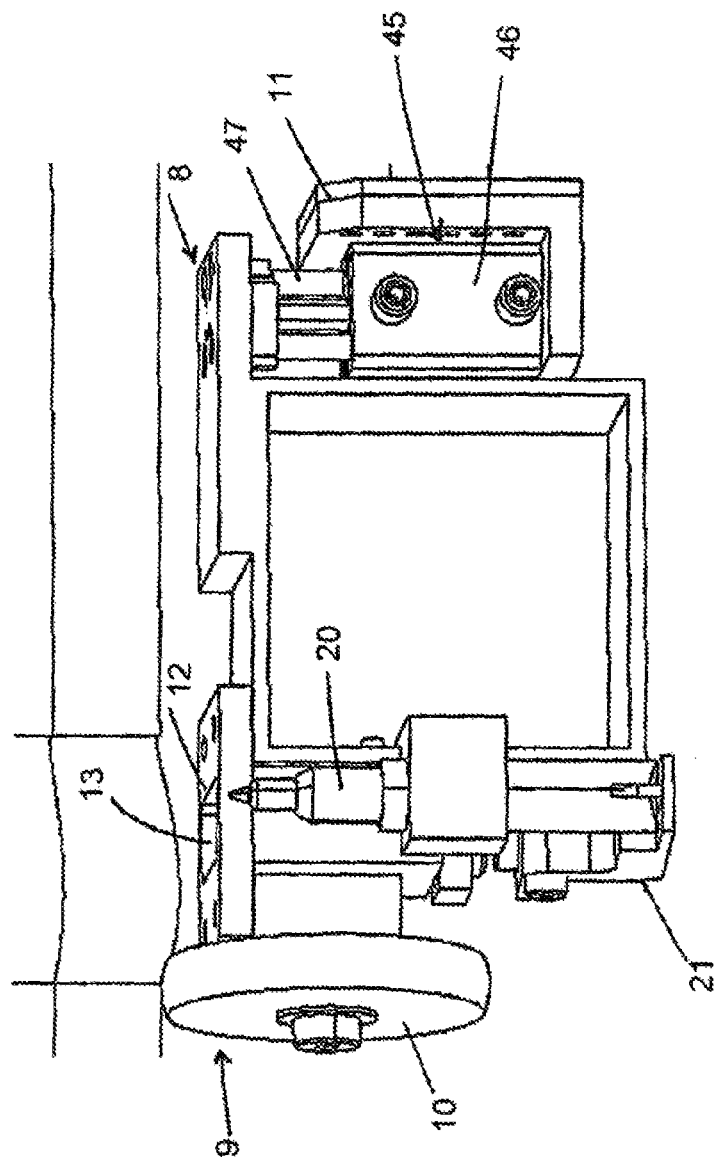
Figure 4:
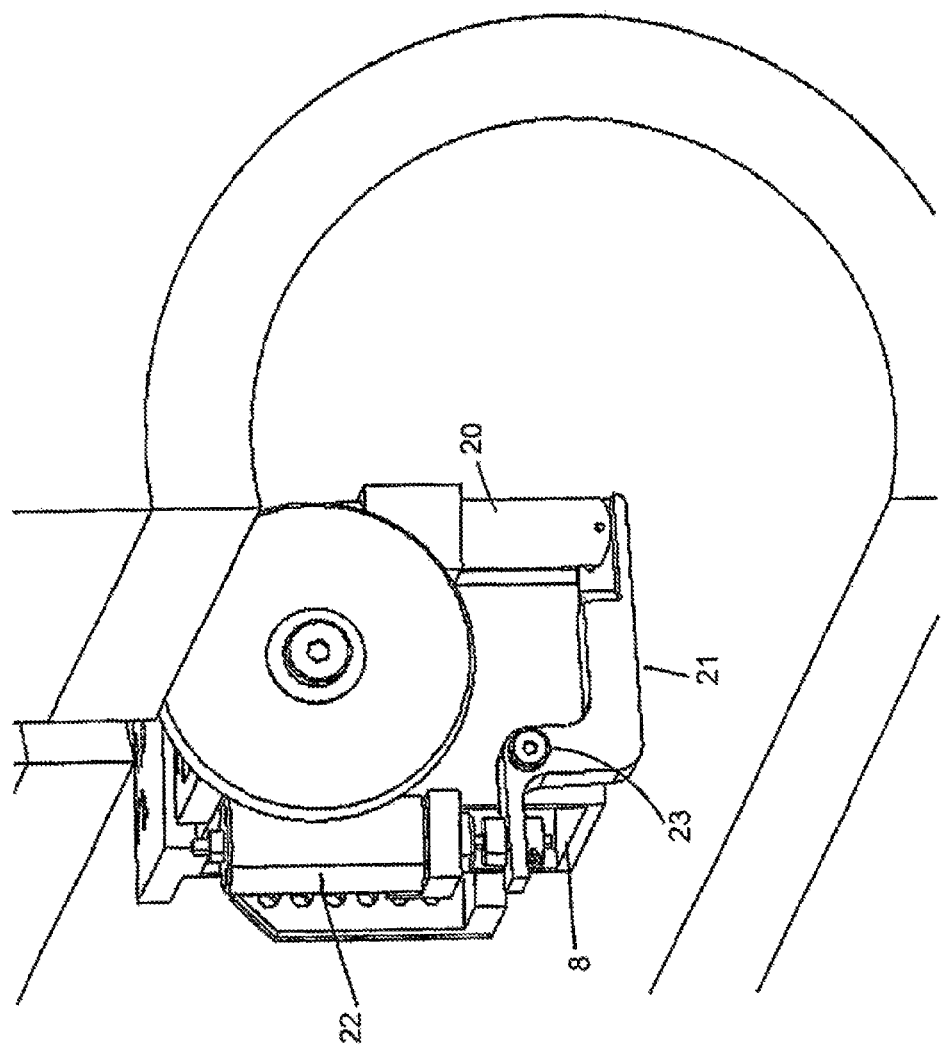
Figure 5:
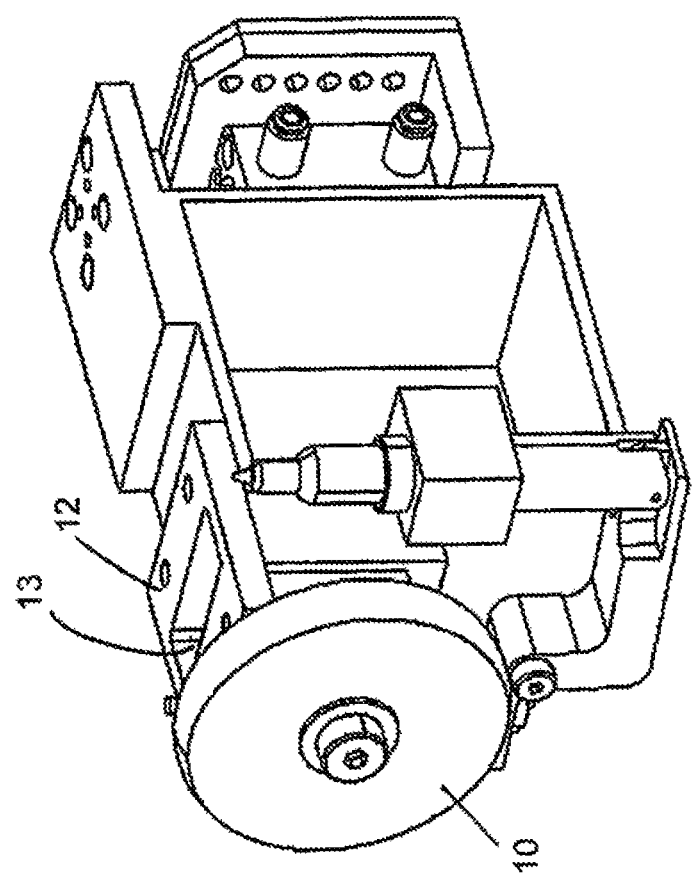
Figure 6:
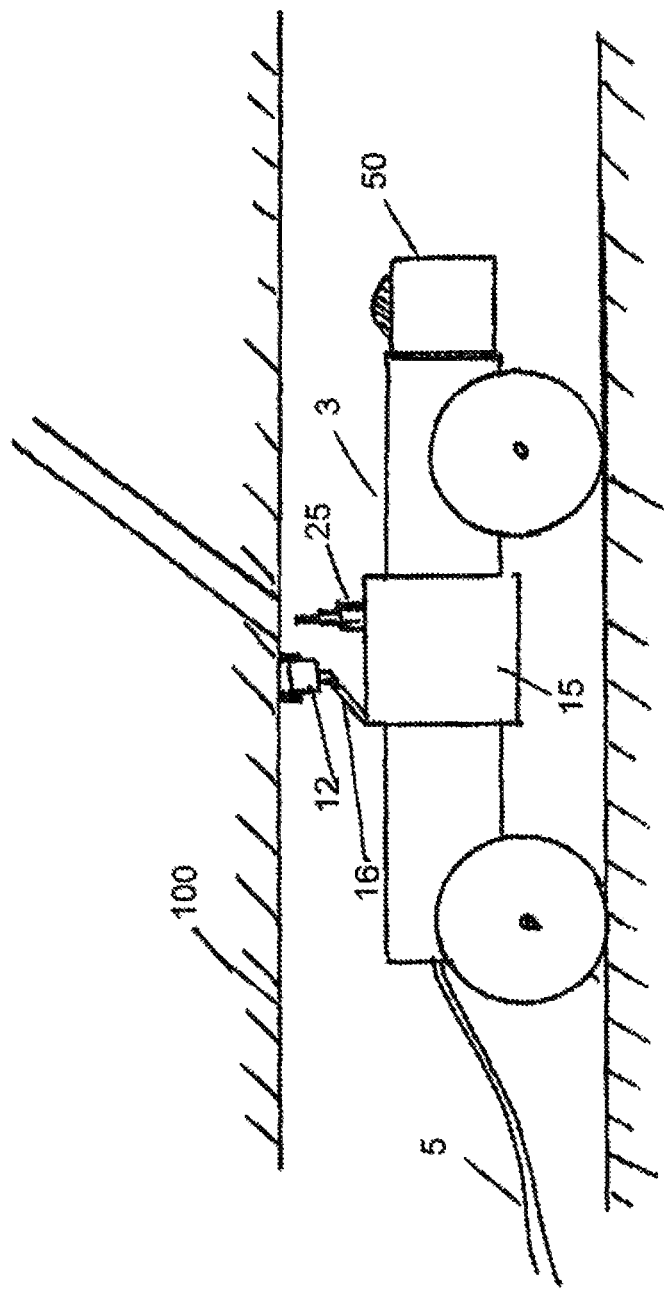
Figure 7:
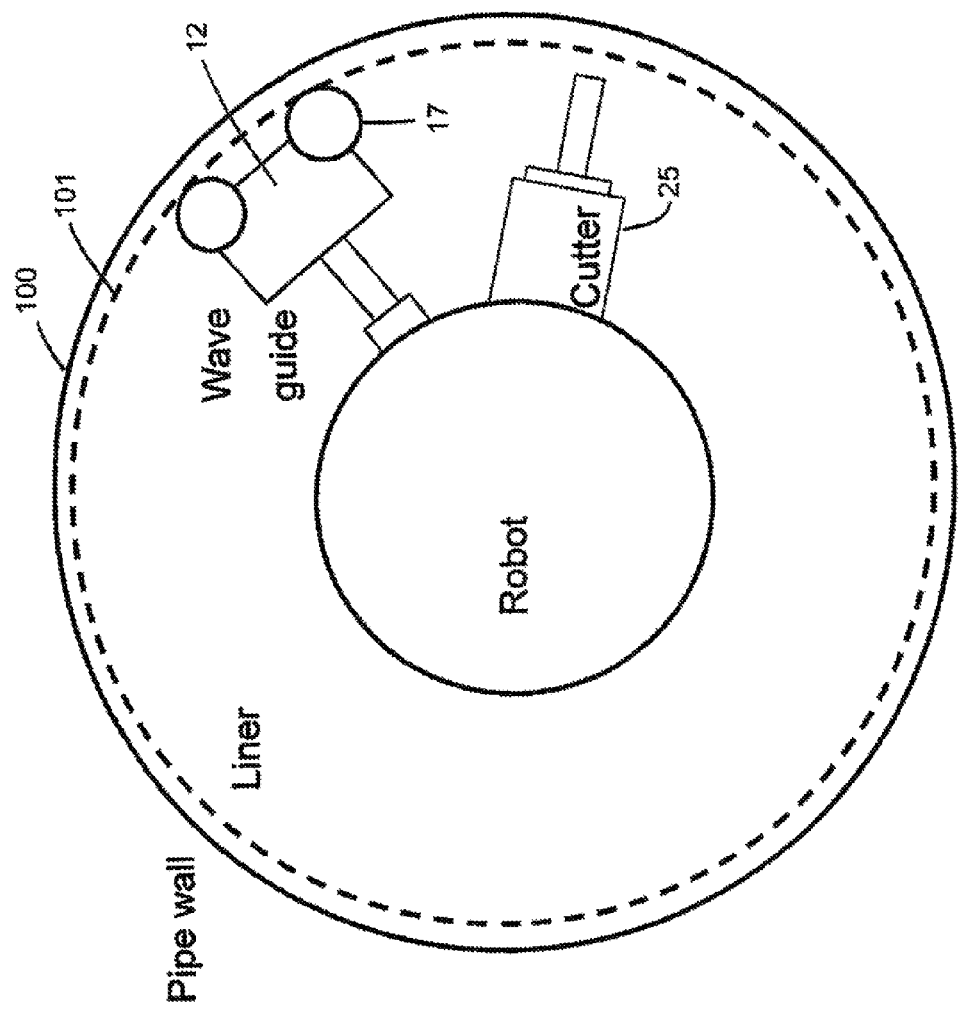
Figure 8:
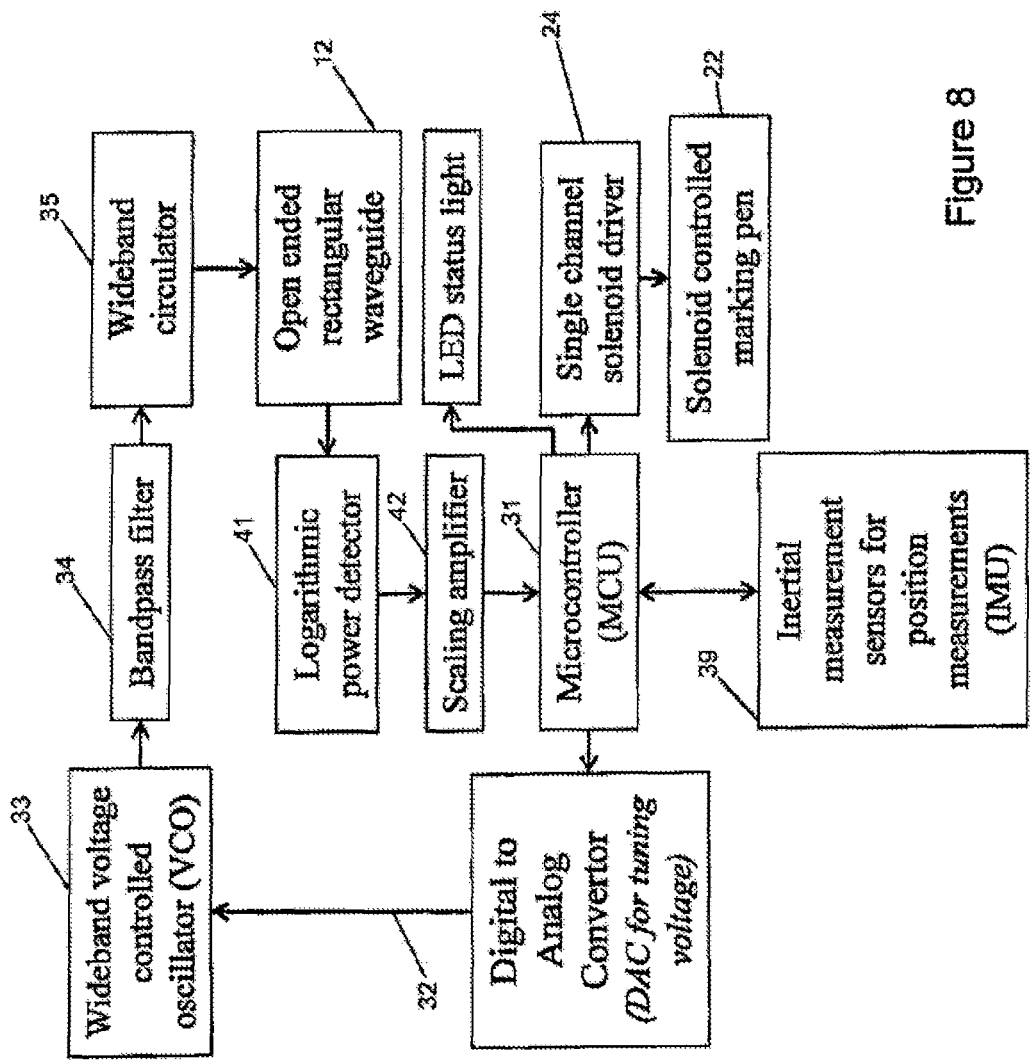
Figures 9A, 9B, 9C:
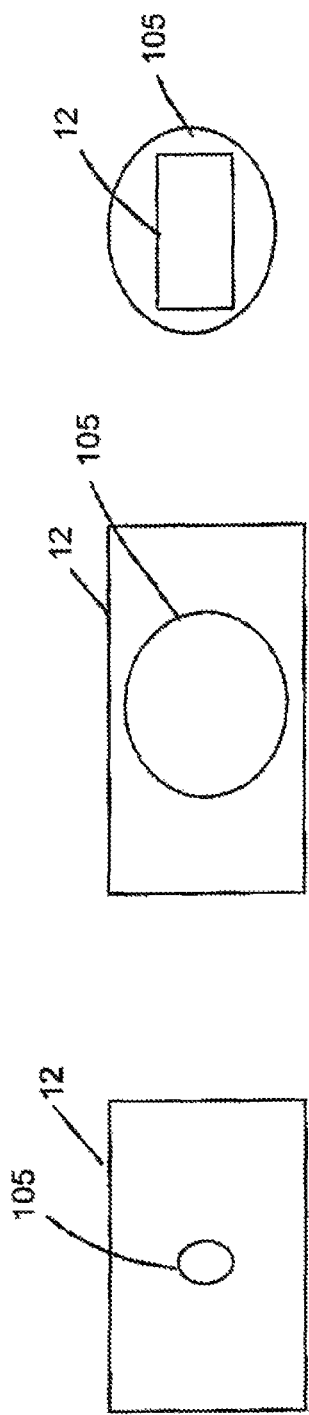
Figure 10:
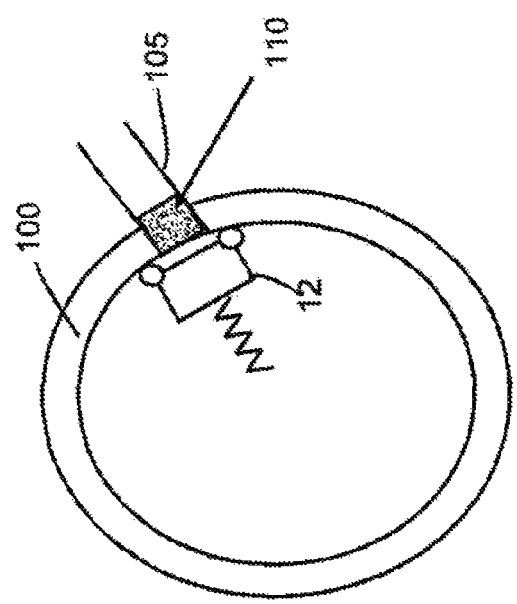
Figure 11:
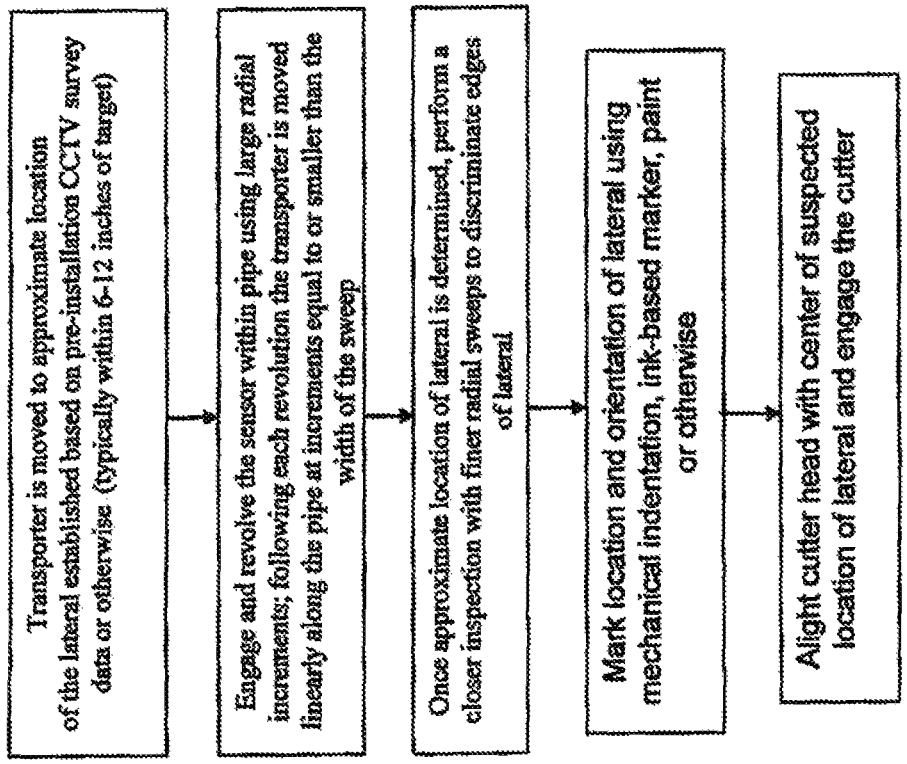

FIG. 1 illustrates one embodiment of a robotic conduit survey apparatus.
FIG. 2 illustrates a side view of the embodiment of FIG. 1.
FIG. 3 illustrates a first view of the adapter body.
FIG. 4 illustrates a second view of the adapter body.
FIG. 5 illustrates a third view of the adapter body.
FIG. 6 illustrates a second embodiment of a robotic conduit survey apparatus.
FIG. 7 illustrates a cross-sectional schematic of the FIG. 6 embodiment within a conduit.
FIG. 8 illustrates electronic components in one embodiment of the conduit survey apparatus.
FIGS. 9A to 9C illustrate alternate waveguide to lateral diameter ratios.
FIG. 10 illustrates a method of using a contrast liquid in one method of the invention.
FIG. 11 illustrates a flow chart of one method of the present invention.

III. DETAILED DESCRIPTION OF SELECTED EMBODIMENTS

One embodiment of the present invention is a method of locating side connections in a pipe (more generally referred to herein as a "conduit") having a thermosetting or thermoplastic liner previously positioned in the conduit using a near-field microwave imaging technique that employs an open-ended rectangular waveguide. The embodiment includes positioning a robotic survey apparatus within the conduit and having the apparatus travel along the conduit in order to detect the side connections (also referred to herein as "lateral connections" or simply "laterals"). FIG. 1 illustrates one embodiment of such a robotic survey apparatus 1. The apparatus includes a carrier or carriage 3 which is capable of movement along the conduit. In many embodiments, the carrier 3 will be self-propelled, but in other embodiments carrier 3 has no internal drive mechanism and would need to be pulled through the conduit by tether or similar means. Carrier 3 will normally have a series of wheels 4, tracks, or other similar traction means, but could also be positioned on sled like structure if pulled through the conduit. One non-limiting example of a suitable self-propelled carrier is the Pipe Ranger™ available from CUES Corporation of Orlando, Fla.

Normally carrier 3 will transport a series of electronic components to detect conditions of interest in and around the conduit. In certain embodiments such as seen in FIG. 1, the carrier may incorporate a camera 50 and electronics for radio sounding of the conduit and the adjacent environment. One example of camera 50 is a cctv camera such as an OZIII optical zoom pan-and-tilt camera system available from CUES Corporation, which may include a lighting system. However, any type of camera (analog or digital) or even carriers without cameras could be employed in alternate embodiments. In the embodiment of FIG. 1, camera 50 is positioned on a rotating head such that the entire inner circumference of the pipe may be viewed.

The embodiment of FIG. 1 includes radio sounding equipment positioned in an adapter body 8, which attached to carrier 3 via support arm 6 (FIG. 2). FIGS. 3-5 illustrate more detailed views of one embodiment of adapter body 8 positioned in a conduit 100. In FIG. 3, the adapter body 8 includes a connecting bracket 11 which attaches to carrier 3's support arm 6. The adapter body includes waveguide 12 and waveguide positioner 9. It will be understood that in many of the embodiments described herein, the "waveguide" includes a shaped tube with an open-end for directing the signal. In the embodiment seen in FIG. 3, waveguide positioner 9 is a disc or wheel shaped positioner 10. The lift apparatus 45 is positioned between connecting bracket 11 and an upper plate of adapter body 8. FIG. 3 suggests how lift base 46 is positioned on connector bracket 11 and lift arm 47 connects to the upper plate of adapter body 8. A solenoid or other linear actuator will extend.

Viewing FIG. 2, it will be understood that when lift arm 47 is raised, disc shaped positioner 10 is raised into place against the inner conduit surface, and the positioner 10 will generally maintain the open throat 13 (FIG. 5) of waveguide 12 relatively close to, but not touching the inner conduit surface in order to optimize the transmission and receipt of signals from waveguide 12. It will also be understood that a rotative mechanism on carrier 3 engages support arm 6. Thus, support arm 3 and adapter body 8 may be rotated relative to carrier 3. Rotation of adapter body 8 allows position wheel 10 (and waveguide 12) to traverse the entire inner circumference of conduit 100.

In most embodiments, the distance waveguide 12 is spaced from the inner conduit surface which is less than two inches, more preferably less than about one inch, and most preferably, less than about 0.5 inches. Because of irregularities along the inner conduit/liner surface, about 0.2 inches may be practical limit of how close the waveguide can travel against the inner wall. Therefore, in many embodiments, the preferred distance of the waveguide 12 from the inner pipe surface is between about 0.2 and 0.5 inches. However, there can be other embodiments where the waveguide can actually contact the conduit/liner surface and actually function as described herein.

The particular waveguide utilized could vary from embodiment to embodiment. In the illustrated embodiments, WR-137 (5.82 GHz to 8.2 GHz (C band)) and WR-90 are two non-limiting examples. The wave guides may have rectangular cross-sections (such as WR-137 and WR-90) or other shaped cross-sections (e.g., circular). Many embodiments will have a cross-sectional area of between about 0.25 and about 2.5 in$^2$ (although other embodiments could be outside this range and the dimensions of the waveguide are typically a function of the operating frequency range). In certain embodiments, there will be a given ratio of wave guide size to the diameter of the lateral expected to be encountered. In certain embodiments, the waveguide is metal or metal lined and hollow or filled with a dielectric material. The three configurations seen in FIGS. 9A to 9C (showing rectangular waveguide 12 and lateral pipe 105) give varying degrees of resolution. The FIG. 9C configuration gives the highest resolution in terms of picking up the edges of the lateral. In certain embodiments utilizing rectangular waveguides, the long dimension of the wave guide is between 30% and 100% of the diameter of the lateral intersecting the conduit. In other embodiments, the short dimension of the rectangular waveguide is 90% to 140% of the diameter of the side connecting member.

In the embodiment of FIG. 1, the adapter body 8 will also house the electronics associated with the radio sounding. For example, the circuitry forming an RF signal generator and an RF signal detector together with the controller controlling the signal generator and signal detector may be positioned in the adapter body 8. FIG. 8 is a block diagram illustrating the electronic components associated with one embodiment of the signal generating and receiving circuitry. The waveguide 12 receives the outgoing signal from a signal generation unit (or signal generator), which in FIG. 8 is formed by digital-to-analog converter 32, wideband voltage controlled oscillator (VCO) 33, bandpass filter 34, and wideband circulator 35. In this configuration, the VCO typically generates the signal, the digital-to-analog converter instructs the VCO when to generate the signal (in essence acting as a form of trigger), and the circulator redirects the signal from the VCO to the waveguide. The circulator, as its name implies, "circulates" the signal by forwarding the outgoing signal to the waveguide and forwarding the received signal to amplifier. Thus, the circulator has two paths—one for the incoming signal and another for the outgoing signal.

Likewise, the returning signal received by the waveguide 12 is fed to the signal detector which in this embodiment is formed by logarithmic power detector 41, wideband circulator 35 and scaling amplifier 42 (generally forming a signal detector). Naturally, these components in FIG. 8 are only one example of a signal generator and signal detector. Any conventional or future developed circuitry performing within the parameters described herein could act as the signal generator and signal detector. The controller (or microcontroller) 31 controls the activation of the signal generator and processes the signals received from the signal detector. In one embodiment, the wideband circulator may be a MIDICO part no: M3C4080—4 GHz to 8 GHz; the logarithmic detector an Analog Devices AD8318—1 MHz to 8 GHz; the voltage controlled oscillator a RFMD UMZ-T2-447-016-G—6.6 GHz to 8.1 GHz; and the controller a Texas Instruments—C2000—Picolo series microcontroller.

In many embodiments, the frequency of the signal output by the frequency generator will be between about 3.95 and about 12.40 GHz (i.e., band designation C to X) and more preferably between about 5.85 to about 8.20 GHz. From 5.85 GHz to 8.20 GHz, the waves passing through the cavity will have the dominant mode. Frequencies above 8.20 GHz can still pass through the cavity but they may switch in to higher order modes which increases signal losses. Generally, the preferred signal frequency is primarily dependent on three factors: 1) it is preferably above the cut-off frequency of the waveguide so it can better propagate inside the cavity; 2) it is preferably within the range such that they exist as dominant modes; and, 3) it is preferably frequencies that can penetrate through materials forming the liners. For instance, high frequencies like 30 GHz may not have enough penetration depth to pass through the entire thickness of the liner (typically between 0.25 to 1.0 inches but can be as much as 3.0 inches or as little as 0.1 inch). Controller 31 may also activate or receive data from other components utilized by the conduit survey apparatus. For example, FIG. 8 illustrates controller 31 communicating with inertial measurement sensor 39 (for determining position of carrier, waveguide, and camera as described in more details below), communicating with solenoid driver 24 (which powers the solenoid 22 for the marking device as described below) and activating appropriate LED status lights to indicate various conditions.

FIGS. 3-5 also illustrate how this embodiment of adapter body 8 includes a mechanism for visually marking the liner surface (e.g., at the point where a side connecting conduit or other item of interest is identified) so that a camera controlled cutting or drilling device (described below) can cut through the liner at the marked location. The marking mechanism includes the pivoting link 21 connected to the adapter body 8 with a marking device 20 (FIG. 3) connected to one end of the pivoting link 21 and an activating device 22 (FIG. 4—a solenoid driven activator in this example) connected to the other end of the pivoting link 21. The connecting pin 23 pivotally connects pivoting link 21 to the adapter body 8. When it is desired to mark a particular location on the inner surface of the liner, solenoid activator 22 is extended pushing one end of the pivoting link 21 downward and raising the marker 20 upwards to engage the liner surface. The actual manner of marking is not critical and various embodiments may include marking with an ink, paint, dye marking device, or a heated tip that burns the surface of the conduit at the location of interest or simply making a mechanical indention which may be detected by a camera or other device capable of sensing the indention.

FIG. 6 illustrates an alternate embodiment of conduit survey apparatus of the current invention. In FIG. 6, the carrier 3 includes a camera 50 and a power/data transmission cord 5 extending to a control station outside of the conduit. In this embodiment, the waveguide 12 is connected to a rotating collar 15 on the carrier 3. The waveguide 12 is connected to collar 15 by the support arm 16 which positions the waveguide 12 against the inner surface of the lined conduit 100. In this embodiment, support arm 16 is retractable in order that the waveguide 12 may be moved out of contact with the liner surface when the carrier is moving down the conduit and then brought into contact with the liner surface when radio sounding operations begin. Preferably, support arm is spring biased toward the liner surface such that the waveguide 12 can deflect away from the wall when surface irregularities are encountered, but still remains in contact with the liner surface. The waveguide 12 may be run over the entire circumference of the inner conduit surface by the rotation of rotating collar 15. FIG. 7 best illustrates how a series of rollers 17 may be connected to the waveguide 12 in order to maintain the open throat of the waveguide slightly offset from the surface of liner 101 (e.g., the 0.2 to 0.5, less than 1, or less than 2 inches) as described above. The electronics described above in reference to FIG. 8 may be positioned within the carrier or, if the waveguide housing is large enough, within that housing. The embodiment of FIGS. 6 and 7 also differs from that of FIG. 1 in that the former is equipped with a drill or cutter 25. In this embodiment, drill/cutter 25 is a telescoping device which can be extend outward to engage and cut the liner and retract inward when not in use. While FIGS. 1 and 6 suggest a cutter and marker on different survey apparatuses, obviously other embodiments of the survey apparatus could include both a cutter and a marker on the same device.

There are many different manners in which the conduit survey device can be employed to detect side connections, the condition of the conduit, or the condition of the substrate/soil surrounding the conduit. The survey device could be employed in conduits constructed of any number of different materials, including polymer pipe, metal pipe (ferrous and non-ferrous), concrete pipe, clay pipe, asbestos cement pipe, or "Orangeburg" pipe (coal tar impregnated wood fiber pipe). Polymer pipes may include conduits constructed primarily of a plastic, or a thermoplastic, or a thermosetting, or a fiberglass reinforced plastic. The conduits being surveyed may be of any type, non-limiting examples including gas lines, culverts, storm drains, sewer pipes, or plastic conduits placed to carry electrical cables or telecommunication cables.

One embodiment of the current invention is a method of locating side connections in a conduit having a plastic liner previously positioned in the conduit. While the particular type of plastic liner is not critical to the invention, non-limiting examples of plastic liners may include thermosetting liners (i.e., cure in place pipe), thermoplastic liners (HDPE, PVC), glass fiber reinforced plastics (GFRP), spray applied or extruded in place epoxy, polyurea and polyurethane coatings. Initially, a survey apparatus such as described above is positioned within the conduit. Often, the user controlling the survey apparatus may direct the carrier down the conduit to an approximate position where the side connection is estimated to be, for example, the approximate location of the side connection as established based on pre-lining measurements. One means of determining the position of the survey apparatus in the conduit may be an inertial measurement senor 39 referenced in FIG. 8. Next, the waveguide will be directed against the liner surface and the RF signal will be transmitted through the waveguide toward the liner surface. The reflected signal received by the RF signal detector will be analyzed to determine a change in at least one electro-magnetic property in a space behind the liner. In certain embodiments, the change in electro-magnetic property is a change in dielectric constant. For example, the change in dielectric constant may be detected by the controller reading a change in power of the reflected signal, normally quantified as a change in voltage.

The rotative orientation of the waveguide along the circumference of the inner conduit wall may be determined by another inertial measurement sensor for each signal reflection received. Thus, reflected signal readings will have at least two spatial parameters associated with the readings: a lateral distance along the length of the conduit and the angular position along the arc of the circumference of the conduit at that lateral location. Although inertial measurement sensors are referenced in FIG. 8, any type of "displacement" sensor which can indicate the spatial parameters described herein could be employed with the apparatuses and methods of the current invention.

There are many procedures which can be used to detect changes in the properties of the conduit and surrounding areas. In one embodiment, the waveguide is rotated 360 degrees while moving forward so as to carry out inspection using a helical path. In certain embodiments, the method will include taking a first series of circumferential readings at a first radial increment where the increment is equal to or less than a diameter of an expected side connection. Once the approximate location of the side connection is detected, a second series of circumferential readings are taken (at that approximate location) using a second radial increment smaller than the first radial increment.

In certain embodiments, the method of detecting side connections will include positioning the apparatus in a conduit having a first dielectric constant and a side conduit forming the side connection of interest having a material with a second dielectric constant positioned within the side conduit. FIG. 10 suggests how main conduit 100 is intersected by side connection 105. In order to enhance the contrast between the main conduit and the side connection, a second material 110 with a significantly different dielectric constant from the main conduit is placed inside connection 105. In one embodiment, this second material may be water. More preferably, this material takes the form of a liquid filled "plug" containing a saline solution or water with other conductive metal salt crystals.

FIG. 11 illustrates one example process which the survey apparatus might employ in scanning for lateral connections. First, the carrier is moved to an approximate location of the lateral (typically within 6-12 inches of the lateral) established by pre-installation CCTV survey data or otherwise. The waveguide then is engaged against the inner conduit surface and rotated using larger radial increments. Following each revolution, the carrier 10 moves linearly along the conduit at increments equal to or smaller than the width of the waveguide. Once an approximate location of the lateral is determined, the apparatus performs a more detailed inspection with finer radial sweeps to determine the edges of the lateral. The location and orientation of the lateral is marked using a mechanical indentation, an ink-based marker, paint or other method. Finally, a cutter device is aligned with center of suspected location of the lateral and the cutter cuts an opening through the liner. In one alternative process, the laterals may have plugs inserted in them prior to the lining process where the plugs are filled with saline solution or another material of a comparatively different dielectric constant.

One alternative embodiment comprises the method having the steps of (i) positioning an waveguide carrying probe within the conduit, (ii) moving the waveguide along a liner surface; (iii) transmitting an RF signal through the wave guide toward the liner surface; (iv) measuring a reflected signal from the RF transmission; and (v) analyzing the reflected signal to determine a change in at least one electro-magnetic property in a space behind the liner. In one variation of this embodiment, the waveguide is positioned with less than two inches and more preferably less than one inch from the liner surface while the RF signal is being transmitted.

Another alternative embodiment is a conduit survey apparatus comprising (a) a carriage capable of movement axially down the conduit; (b) an RF signal generator and an RF signal detector positioned on the carriage; (c) a controller controlling the signal generator and signal detector; and (d) a waveguide with an open throat transmitting signals from the signal generator and directing received signals to the signal detector. A variation of this embodiment includes a waveguide positioner mounted on the carrier and adapted to selectively engage an interior wall of the conduit, wherein the waveguide guide is connected to the positioner such that the open throat of the waveguide is within about 1 inch of the interior wall when the positioner engages the interior wall.

Although the above description is in terms of certain specific embodiments, those skilled in the art will recognize many modifications and variations that can be made upon the disclosed inventive concept. For example, while certain methods described above relate to finding side connections in conduits repaired with a plastic liner, other methods may include locating voids/low density areas outside of plastic pipes, detecting "cross-bores" (i.e, the paths of two conduits intersect, as sometimes happens during trenchless installations using a Horizontal Directional Drilling (HDD) method), and locating poor areas of compaction around large diameter thermoplastic culvert structures. All such modifications and variations are intended to come within the scope of the following claims.

The invention claimed is:

1. A method of locating side connections in a conduit having a plastic liner previously positioned in the conduit, the method comprising the steps of:
    a. positioning a waveguide probe within the conduit, the probe comprising:
        i. an RF signal generator;
        ii. an RF signal detector;
        iii. a controller controlling the signal generator and signal detector;
        iv. an open-ended rectangular waveguide transmitting signals from the signal generator and to signal detector;
        v. a probe carriage capable of movement axially down the conduit and positioning the waveguide adjacent to a liner surface and moving the waveguide in a generally circumferential direction along the liner surface; and
        iv. a rolling surface offsetting the waveguide a distance of less than about one inch from the liner surface;
    b. moving the waveguide along the liner surface with the rolling surface engaging the liner surface;
    c. transmitting an RF signal through the wave guide toward the liner surface;
    d. measuring a reflected signal from the RF transmission;
    e. analyzing the reflected signal to determine a change in at least one electro-magnetic property in a space behind the liner.

2. The method of claim 1 wherein the change in electro-magnetic property is dielectric constant.

3. The method of claim 2 wherein the controller determines a change in the dielectric constant by detecting a change in power of the reflected signal.

4. The method of claim 3 wherein the decrease in power is quantified as a change in voltage.

5. The method of claim 1 wherein the transmitted RF signal is within the range of about 3 GHz to about 20 GHz.

6. The method of claim 1 wherein the waveguide is rectangular in cross-sectional shape.

7. The method of claim 6 wherein the waveguide has a cross-sectional area of about 0.25 in$^2$ to about 2.5 in$^2$.

8. The method of claim 1 wherein the probe carriage further includes a cutter device capable of forming an aperture in the liner.

9. The method of claim 1 wherein the conduit in which the probe is positioned has a first dielectric constant and a side conduit forming the side connection has a material with a second dielectric constant positioned within the side conduit.

10. The method of claim 9 wherein the material with a second dielectric constant is water.

11. The method of claim 9 wherein the second material is a plug containing a saline solution or conductive metal salt crystals.

12. The method of claim 1 wherein the wave guide is rectangular and the short dimension of the wave guide is between 30% and 100% of than the diameter of a side connecting member intersecting the conduit.

13. The method of claim 1 wherein a long dimension of a rectangular wave guide is 90% to 140% of the diameter of the side connecting member.

14. The method of claim 1, further taking a first series of circumferential readings at a first radial increment where the increment is equal to or less than a diameter of an expected side connection.

15. The method of claim 14, wherein once the approximate location of the side connection is detected, taking a second series of circumferential readings at a second radial increment smaller than the first radial increment.

16. A conduit survey apparatus comprising:
    a. a carriage capable of movement axially down the conduit;
    b. an RF signal generator and an RF signal detector positioned on the carriage;
    c. a controller controlling the signal generator and signal detector;
    d. a waveguide with an open throat transmitting signals from the signal generator and directing received signals to the signal detector, and
    e. a waveguide positioner mounted on the carrier and adapted to selectively engage an interior wall of the conduit, wherein the waveguide guide is connected to the positioner such that the open throat of the waveguide is within about 1 inch of the interior wall when the positioner engages the interior wall.

17. The conduit survey apparatus of claim 16 wherein the waveguide positioner is disc-shaped and both the waveguide positioner and the waveguide are positioned on an adapter body.

18. The conduit survey apparatus of claim 16 wherein the waveguide positioner comprises at least two rollers attached to the waveguide.

19. The conduit survey apparatus of claim 16 wherein a support arm extends from the carriage and an adapter body is positioned on the support arm, and wherein the RF signal generator, the RF signal detector, the controller, the waveguide, and the waveguide positioner are mounted on the adapter body.

20. The conduit survey apparatus of claim 19 wherein support arm is capable of moving the adapter body in a rotative direction relative to a conduit inner surface.

* * * * *